US010491426B2

(12) United States Patent
Xu et al.

(10) Patent No.: US 10,491,426 B2
(45) Date of Patent: Nov. 26, 2019

(54) METHOD AND APPARATUS FOR SETTING UP X2 CONNECTION THROUGH GATEWAY (71) Applicant: Samsung Electronics Co., Ltd., Suwon-si, Gyeonggi-do (KR)

(72) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 14/432,121

(22) PCT Filed: Sep. 30, 2013

(86) PCT No.: PCT/KR2013/008731
§ 371 (c)(1),
(2) Date: Mar. 27, 2015

(87) PCT Pub. No.: WO2014/051402
PCT Pub. Date: Apr. 3, 2014

(65) Prior Publication Data
US 2015/0289302 A1 Oct. 8, 2015

(30) Foreign Application Priority Data

Sep. 28, 2012 (CN) .......................... 2012 1 0371285
Aug. 9, 2013 (CN) .......................... 2013 1 0345503

(51) Int. Cl.
*H04L 12/66* (2006.01)
*H04W 76/10* (2018.01)
(Continued)

(52) U.S. Cl.
CPC ............ *H04L 12/66* (2013.01); *H04L 65/102* (2013.01); *H04W 8/26* (2013.01); *H04W 76/10* (2018.02); *H04W 92/045* (2013.01); *H04W 92/20* (2013.01)

(58) Field of Classification Search
None
See application file for complete search history.

(56) References Cited

U.S. PATENT DOCUMENTS 9,277,464 B2* 3/2016 Jung ................. H04W 36/0072
2011/0237258 A1* 9/2011 Nylander ............. H04J 11/0093
455/437

(Continued)

FOREIGN PATENT DOCUMENTS

CN 102457915 A 5/2012
KR 10-2011-0120225 A 11/2011

(Continued)

OTHER PUBLICATIONS

Nokia Siemens Networks "X2-proxy", R3-120437, 3GPP TSG RAN WG3, #75 meeting Dresden, Germany, Feb. 6-10, 2012, paragraphs [6.2.1.2]-[6.2.1.5] (Year: 2012).*

(Continued)

*Primary Examiner* — Saba Tsegaye
(74) *Attorney, Agent, or Firm* — Jefferson IP Law, LLP (57) ABSTRACT A method for setting up X2 through a gateway (GW) is provided. The method includes a home base station obtaining an Internet Protocol (IP) address of a neighbor base station through a Transport Network Layer (TNL) address discovery process, transmitting to an X2 GW the obtained IP address of the neighbor base station, and receiving an X2 setup information confirmation message from the X2 GW, initiating an X2 interface setup process with the neighbor base station, or initiating an evolved NodeB (eNB) configuration update process with the neighbor base station. The (Continued)

method can reduce impact on a macro base station, and reduce complexity of configuration of an operator, so that an X2 handover is practicable.

4 Claims, 7 Drawing Sheets

(51) Int. Cl.
*H04W 92/04* (2009.01)
*H04L 29/06* (2006.01)
*H04W 8/26* (2009.01)
*H04W 92/20* (2009.01)

(56) References Cited

U.S. PATENT DOCUMENTS

| | | | |
|---|---|---|---|
| 2011/0274086 A1* | 11/2011 | Xu | H04L 63/061 370/331 |
| 2011/0310791 A1 | 12/2011 | Prakash et al. | |
| 2012/0100860 A1 | 4/2012 | Lei et al. | |
| 2012/0188984 A1 | 7/2012 | Takahashi et al. | |
| 2013/0322390 A1* | 12/2013 | Xu | H04W 76/02 370/329 |
| 2015/0016306 A1* | 1/2015 | Masini | H04L 41/0809 370/255 |
| 2015/0109999 A1* | 4/2015 | Godin | H04W 92/20 370/328 |

FOREIGN PATENT DOCUMENTS

| | | |
|---|---|---|
| KR | 10-2011-0123681 A | 11/2011 |
| WO | 2012-025059 A1 | 3/2012 |
| WO | 2012/148217 A | 11/2012 |

OTHER PUBLICATIONS

R3-112459, Solution for mobility enhancement between eNB and HeNB, 3GPP TSG RAN WG3 #73bis, Aug. 26, 2011.

* cited by examiner

METHOD AND APPARATUS FOR SETTING UP X2 CONNECTION THROUGH GATEWAY

CROSS-REFERENCE TO RELATED APPLICATION(S)

This application is a U.S. National Stage application under 35 U.S.C. § 371 of an International application filed on Sep. 30, 2013 and assigned application number PCT/KR2013/008731, which claims the benefit of a Chinese patent application filed on Sep. 28, 2012 in the State Intellectual Property Office and assigned Serial number 201210371285.0, and of a Chinese patent application filed on Aug. 9, 2013 in the State Intellectual Property Office and assigned Serial number 201310345503.8, the entire disclosure of each of which is hereby incorporated by reference.

TECHNICAL FIELD

The present disclosure relates to mobile communication technologies, and particularly to a method and apparatus for setting up an X2 connection through a gateway.

BACKGROUND

In a mobile communication system of the related art, in order to provide a better service to a subscriber group, it is generally required to form a plurality of radio resource management entities (i.e., a network entity which is used for managing radio resources and access of a user equipment (UE) in a radio access network, such as a base station or a cell in a variety of mobile communication systems) into a Closed Subscriber Group (CSG) for the specific subscriber group. For example, all subscribers within a company or a school are equal to a specific subscriber group, a plurality of radio resource management entities are formed into a CSG for this specific subscriber group to provide a special access service. It is widespread in a mobile communication system to form a plurality of radio resource management entities into a CSG for a specific subscriber group. In order to make this case clearer, a long term evolution (LTE) system of system architecture evolution (SAE) is taken as an example for explanation hereinafter.

Figure 1:
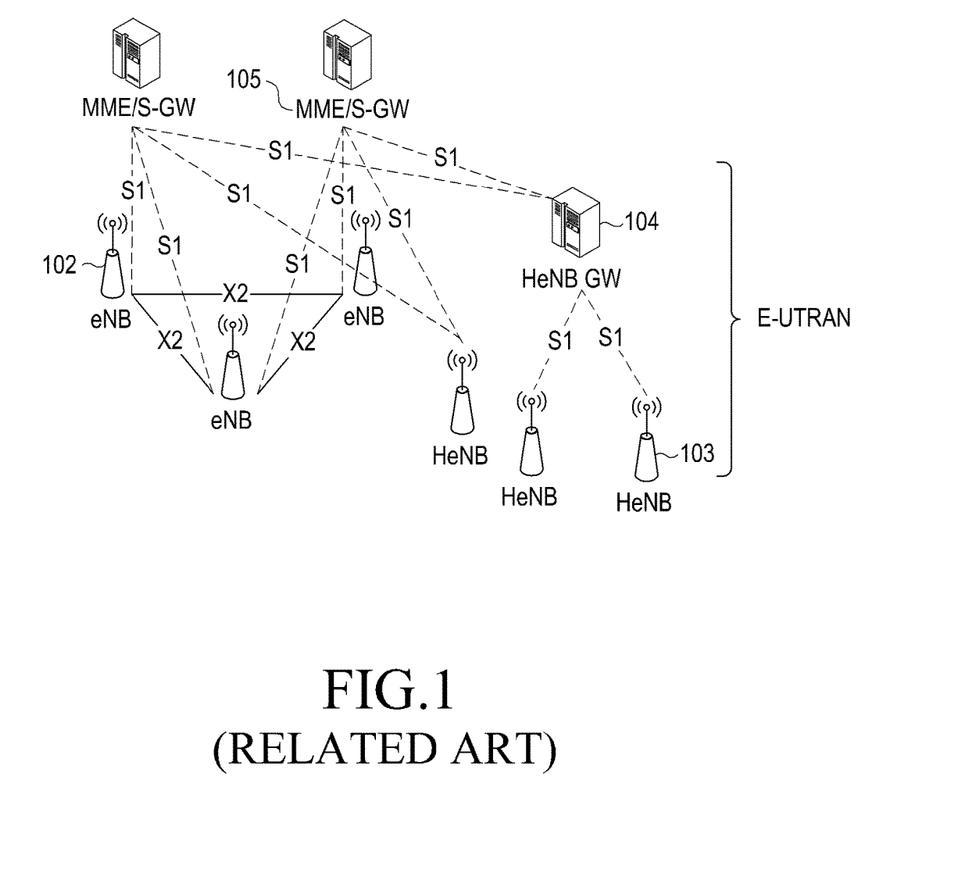
FIG. 1 is a schematic diagram illustrating a structure of a long term evolution (LTE) system according to the related art.

FIG. 1 is a structure of the LTE system according to the related art.

Referring to FIG. 1, in a radio access network of the LTE system, a radio resource management entity includes a macro base station (e.g., evolved NodeB (eNB) 102) and a home eNodeB (HeNB) 103. A HeNB gateway (HeNB GW) 104 is optionally included in the radio access network. The eNB 102 may be directly connected with a mobile management entity (MME) 105 in a core network. When the HeNB GW 104 is included in the radio access network, the HeNB 103 is connected with the MME 105 through the HeNB GW 104. When the HeNB GW 104 is not included in the radio access network, the HeNB 103 may be directly connected with the MME 105.

For the radio resource management entity in the LTE system, in order to provide a richer access service, HeNBs of various types are provided in the related art, wherein the various types include an open type, a hybrid type and a CSG type. There is not a subscriber group of a specific access for an open HeNB, and any UE may access the open HeNB. A CSG HeNB is an HeNB that is used by the above described subscriber group consisting of all of the subscribers in the company or the school, the CSG HeNB only permits the access of a UE in the specific subscriber group which the CSG HeNB serves (for convenience of description, hereinafter a UE in a specific subscriber group is referred to as a CSG UE). A hybrid HeNB may form a CSG together with another HeNB, and permit the access of a CSG UE which the hybrid HeNB serves, at the same time, the hybrid HeNB may also permit the access of a non-CSG UE (i.e., a UE which does not belong to the CSG).

As can be seen from the above description, in the mobile communication system according to the related art, a plurality of radio resource management entities may be formed into a CSG to provide a CSG radio resource management entity, e.g., a CSG HeNB, and a hybrid radio resource management entity may be further provided to provide a richer access service, e.g., a hybrid HeNB. At the same time, the macro base station eNB may also support a function of the CSG, or may be used as a hybrid eNB when supporting the function of the CSG.

Figure 2:
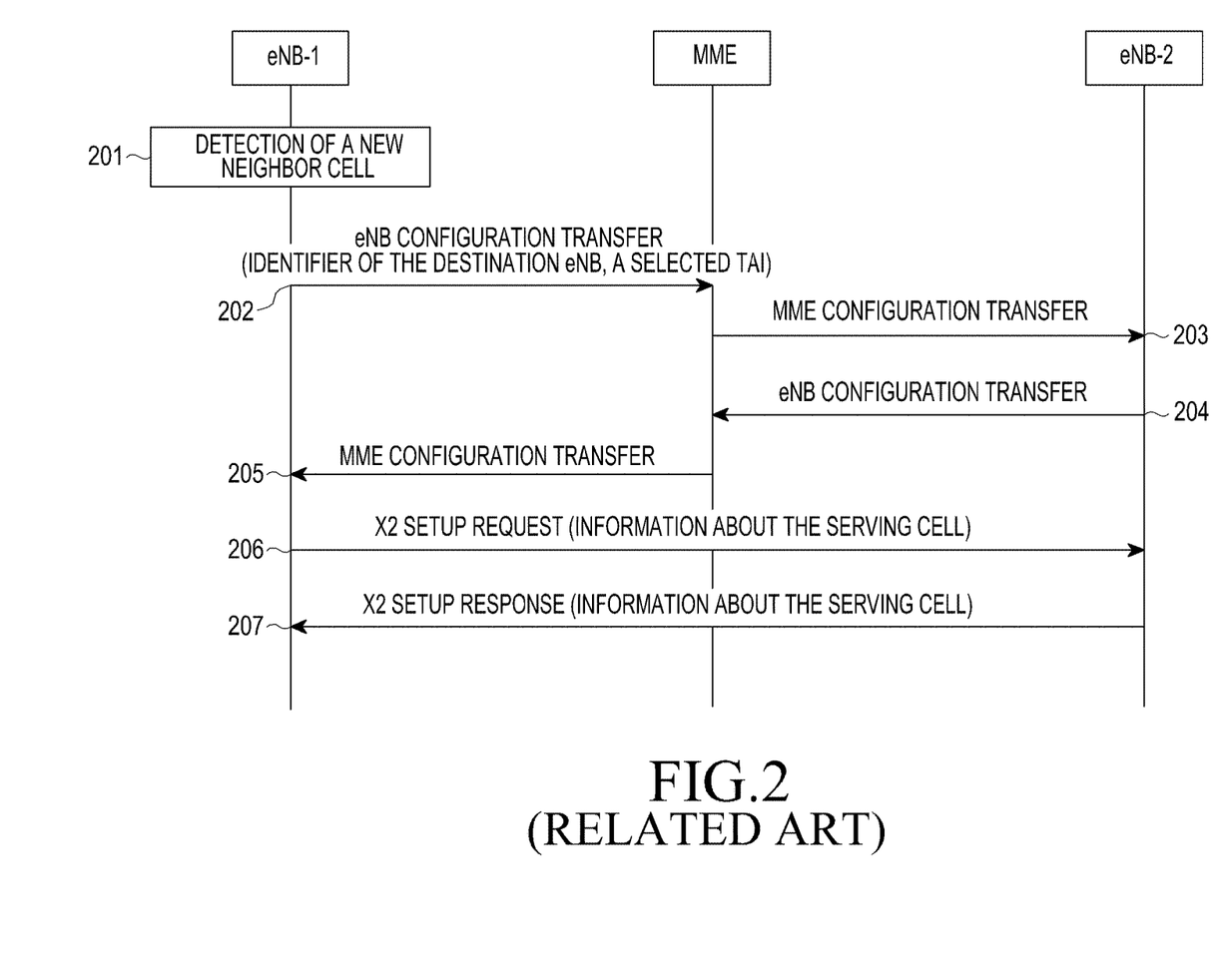
FIG. 2 is a schematic diagram illustrating an X2 setup process between evolved NodeBs (eNBs) according to the related art.

FIG. 2 is a schematic diagram illustrating an X2 setup process between eNBs according to the related art.

In the related art, for example, eNB1 detects a new neighbor cell, it is illustrated in FIG. 2 that eNB1 triggers an X2 setup process. It is easy to understand that descriptions of some processes which are optional and are well known to a person skilled in the art are omitted hereinafter. The X2 setup process may include operations as follows.

Referring to FIG. 2, at operation 201, eNB1 detects a new neighbor cell.

The eNB1 detects the new neighbor cell through a report of a UE, and the new neighbor cell is in eNB2.

At operation 202, eNB1 transmits to a MME an eNB configuration transfer message. The message contains an identifier of a source eNB, an identifier of a destination eNB, and self-optimization networks (SONs) information. The identifier of the source eNB is configured as a global eNB identifier of eNB1 and a selected tracking area identifier (TAI). The identifier of the destination eNB is configured as a global eNB identifier of eNB2 and the selected TAI. The SON information is configured as an information request which requests configuration information of an X2 Transport Network Layer.

At operation 203, the MME finds the destination eNB according to the identifier of the destination eNB (including the global eNB identifier and the selected TAI), and transmits to eNB2 a MME configuration transfer message.

At operation 204, eNB2 transmits to the MME the eNB configuration transfer message. The message contains the identifier of the source eNB, the identifier of the destination eNB, and the SON information. The identifier of the source eNB is configured as the global eNB identifier of eNB2 and the selected TAI. The identifier of the destination eNB is configured as the global eNB identifier of eNB1 and the selected TAI. The SON information includes SON information response which includes a Transport Network Layer (TNL) address of eNB2.

At operation 205, the MME transmits to eNB1 the MME configuration transfer message.

At operation 206, eNB1 transmits to eNB2 an X2 setup request message.

At operation 207, eNB2 transmits to eNB1 an X2 setup response message.

In a situation where there is a home base station, in order to reduce the on the core network, it is proposed to support an X2 handover between an eNB and the home base station. Considering that there are a larger number of home base stations within the coverage of the eNB, if the eNB sets up an X2 connection with each neighbor home base station, a great burden will be caused to the eNB, especially the burden of the transport network layer. In addition, the home base stations often start up and shutdown, which also brings a negative impact on the eNB, as a result, a concept of an X2 gateway (X2 GW) is proposed.

Figure 3:
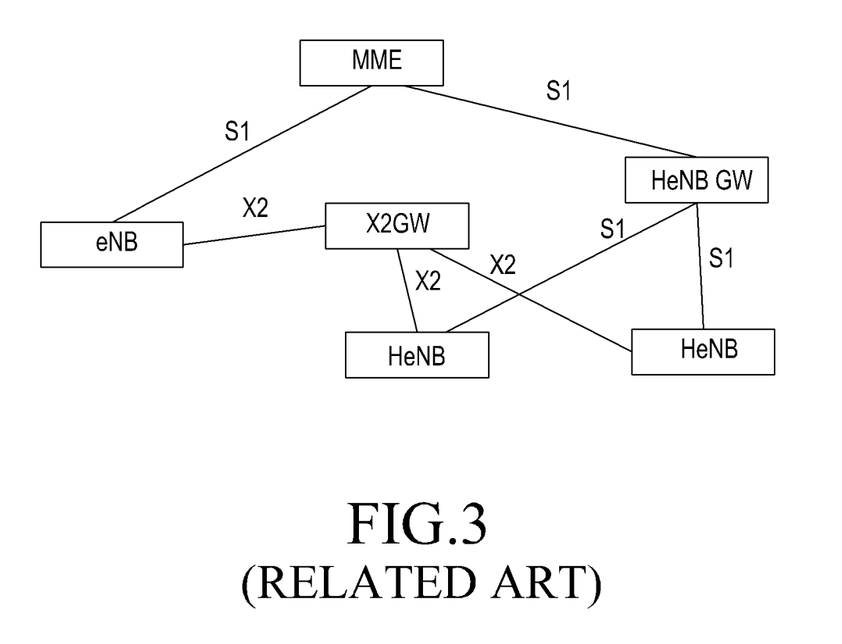
FIG. 3 is a schematic diagram illustrating a structure of a system including an X2 gateway (X2 GW) according to the related art.

FIG. 3 is a schematic diagram illustrating a structure of a system including an X2 GW according to the related art.

Referring to FIG. 3, the HeNB is connected with the eNB through the X2 GW.

In this situation, the existing X2 setup process cannot complete an X2 setup process between the eNB and the X2 GW or an X2 setup process between the eNB and a peer HeNB through the X2 GW, and it is not resolved in the related art how to perform the X2 setup process. One method is to complete the setup through configuration of an operator, e.g., configuration of the eNB, the HeNB, the X2 GW, but this method brings a great burden to the operator.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for setting up X2 through a gateway (GW), which can reduce impact on a macro base station, and reduce complexity of configuration of an operator, so that an X2 handover is practicable.

In accordance with an aspect of the present disclosure, a method for setting up X2 through a GW is provided. The method includes a home base station obtaining an Internet protocol (IP) address of a neighbor base station, the home base station transmitting to an X2 GW the obtained IP address of the neighbor base station, and the X2 GW initiating an X2 interface setup process with the neighbor base station, or initiating an evolved NodeB (eNB) configuration update process with the neighbor base station.

The method includes the X2 GW transmitting to the home base station X2 setup information confirmation message.

It should be noted that the X2 setup information confirmation message includes information about a serving cell.

It should be noted that the information about the serving cell includes information about a serving cell of the neighbor base station.

It should be noted that the home base station sends to the X2 GW the obtained IP address of the neighbor base station through an X2 setup request message, or an eNB configuration update message, or a new message.

It should be noted that the X2 setup information confirmation message is an X2 setup response message, or an eNB configuration update confirmation message, or a new message.

It should be noted that the X2 GW sends to the neighbor base station an IP address of the home base station.

It should be noted that the neighbor base station sends to the X2 GW a failure message if the neighbor base station does not accept an X2 setup request or the eNB configuration update of the X2 GW, wherein the failure message includes an IP address or an identifier of the home base station.

In accordance with another aspect of the present disclosure, a method for setting up X2 through a GW is provided. The method includes a source base station detecting a new neighbor cell, the source base station requesting a TNL address of a base station where the new neighbor cell locates, wherein the base station where the new neighbor cell locates is a home base station which is connected to an X2 GW, the home base station transmitting to the source base station a TNL address of the X2 GW to which the home base station is connected, and the source base station initiating an X2 interface setup process with the X2 GW, or initiating an eNB configuration update process with the X2 GW.

It should be noted that the home base station transmits to the source base station an identifier of the X2 GW to which the home base station is connected.

It should be noted that an X2 setup request message in the X2 interface setup process includes information about a serving cell of the home base station connected to the X2 GW.

As can be seen from the above technical solution, the method for setting up X2 through a GW provided by the present disclosure can reduce impact on a macro base station, and reduce complexity of configuration of an operator, so that an X2 handover is practicable.

In accordance with another aspect of the present disclosure, a method for setting up an X2 connection through an X2 GW by a home base station is provided. The method includes obtaining an IP address of a neighbor base station, transmitting to the X2 GW the obtained IP address of the neighbor base station, and receiving an X2 setup information confirmation message, from the X2 GW, initiating an X2 interface setup process with the neighbor base station, or initiating an eNB configuration update process with the neighbor base station.

In accordance with another aspect of the present disclosure, a method for setting up an X2 connection by an X2 GW is provided. The method includes receiving, from a home base station an IP address of a neighbor base station obtained by the home base station, initiating an X2 interface setup process with the neighbor base station, or an eNB configuration update process with the neighbor base station, and transmitting an X2 setup information confirmation message to the home base station.

In accordance with another aspect of the present disclosure, an apparatus for setting up an X2 connection through an X2 GW is provided. The apparatus includes a controller for obtaining an IP address of a neighbor base station, a transmitter for transmitting to the X2 GW the obtained IP address of the neighbor base station, and a receiver for receiving an X2 setup information confirmation message, from the X2 GW initiating an X2 interface setup process with the neighbor base station, or an eNB configuration update process with the neighbor base station.

In accordance with another aspect of the present disclosure, an apparatus for setting up an X2 connection by an X2 GW is provided. The apparatus includes a receiver for receiving, from a home base station an IP address of a neighbor base station obtained by the home base station, a controller for initiating an X2 interface setup process with the neighbor base station, or an eNB configuration update process with the neighbor base station, and a transmitter for transmitting an X2 setup information confirmation message to the home base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

Figure 4:
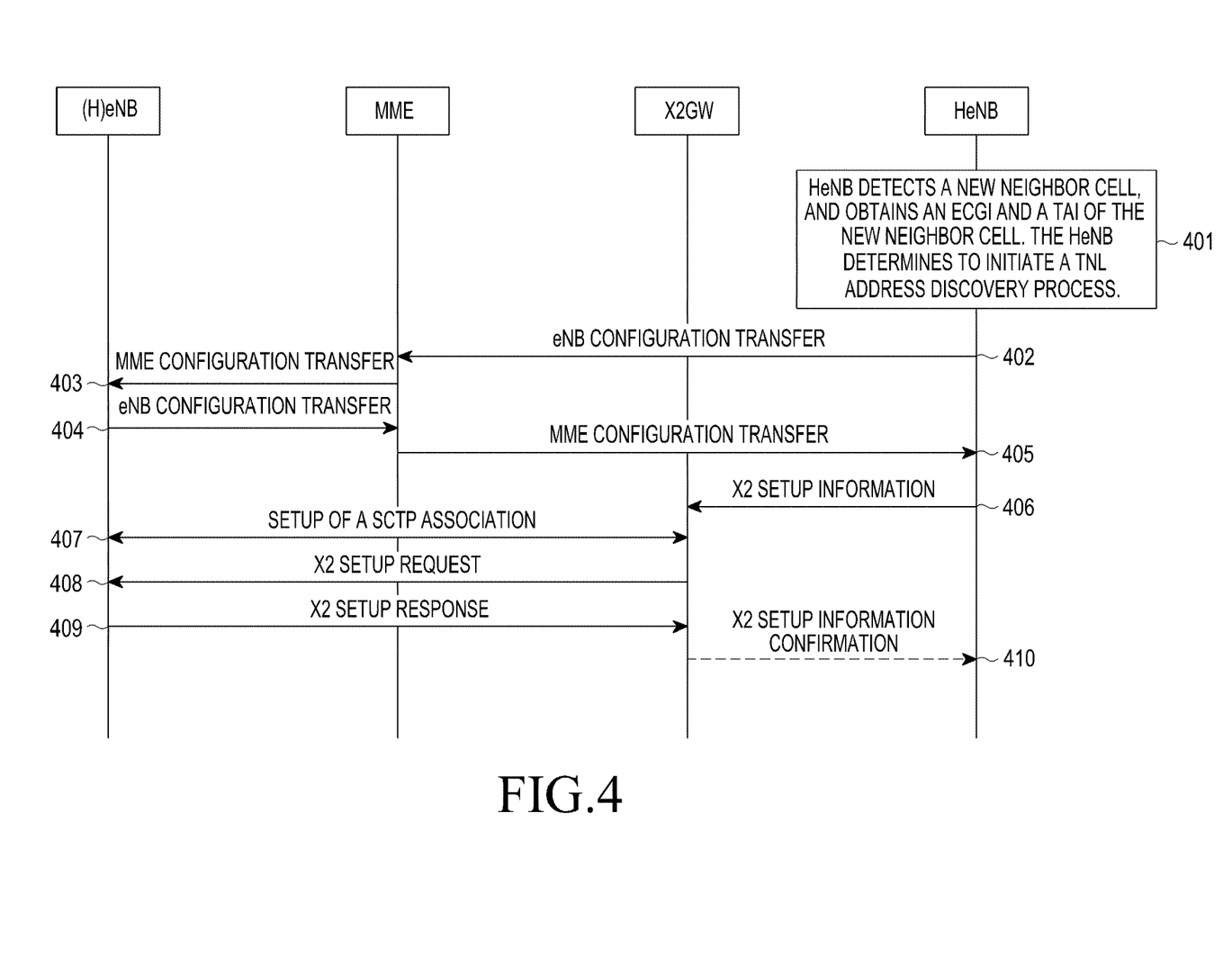
FIG. 4 is a schematic diagram illustrating a first embodiment for setting up X2 through a gateway (GW) according to an embodiment of the present disclosure.

FIG. 4 illustrates the first embodiment for setting up X2 through a gateway (GW) according to an embodiment of the present disclosure. In this embodiment, a home evolved NodeB (HeNB) detects a new neighbor cell covered by an eNB (or an HeNB), and triggers an X2 setup process. The following is a detailed description of this embodiment of the present disclosure. It is omitted herein that the detailed descriptions of operations which are not related to contents of the present disclosure.

Referring to FIG. 4, at operation 401, the HeNB detects a new neighbor cell.

The HeNB detects a new neighbor cell through a report of a user equipment (UE). The HeNB obtains an evolved cell global identifier and a Tracking Area Identifier (TAI) of the neighbor cell through the report of the UE. A global eNB identifier may be obtained according to an Evolved Cell Global Identifier (ECGI). The HeNB determines to initiate a Transport Network Layer (TNL) address discovery process.

At operation 402, the HeNB transmits to a mobile management entity (MME) an eNB configuration transfer message, wherein the message contains an identifier of a source eNB, an identifier of a destination eNB, and self optimization network (SON) information. The identifier of the source eNB is set as a global eNB identifier of the HeNB and the selected TAI. The identifier of the destination eNB is set as a global eNB identifier of the eNB (or the HeNB) where the new neighbor cell locates and the selected TAI. The SON information is configured as an information request which requests configuration information of an X2 TNL.

In a situation where there an HeNB GW is deployed, the eNB configuration transfer message is transmitted to the MME through the HeNB GW.

At operation 403, the MME finds the destination eNB (or the HeNB) according to the identifier of the destination eNB (including the global eNB identifier and the selected TAI), and transmits to the destination eNB (or the HeNB) a MME configuration transfer message.

At operation 404, the eNB (or the HeNB) transmits to the MME an eNB configuration transfer message. The message contains the identifier of the source eNB, the identifier of the destination eNB, and the SON information. The identifier of the source eNB is set as the global eNB identifier of the eNB (or the HeNB) and the selected TAI. The identifier of the destination eNB is set as the global eNB identifier of the HeNB and the selected TAI. The SON information includes a SON information response which includes a TNL address of the eNB (or the HeNB).

At operation 405, the MME transmits to the HeNB a MME configuration transfer message.

In the situation where there the HeNB GW is deployed, the MME configuration transfer message is transmitted to the HeNB through the HeNB GW.

At operation 406, the HeNB transmits X2 setup information to an X2 GW. In this case, the X2 setup information may be a X2 setup request message of the related art, or an eNB configuration update message, or a new message.

The HeNB knows an Internet Protocol (IP) address of the X2 GW to which the HeNB is connected through pre-configuration or other methods. The message is the X2 setup request message or the new message if a Stream Control Transmission Protocol (SCTP) association has not been set up between the HeNB and the X2 GW, and the HeNB is required to set up a SCTP association before sending the X2 setup information. The message is the X2 setup request message or the new message if an X2 connection is not set up between the HeNB and the X2 GW, and an X2 interface between the HeNB and the X2 GW is set up through the operation 406. The message in the present operation may be the X2 setup request message, or the eNB configuration update message, or the new message if the X2 connection has been set up between the HeNB and the X2 GW. It should be noted that the X2 interface has been set up may mean that the X2 setup procedure is performed between two nodes.

The X2 setup information includes a TNL address of the eNB (or the HeNB) where the neighbor cell locates, i.e., an IP address. The X2 setup information message may include information about a serving cell of the HeNB, or may include information about a neighbor cell of the serving cell of the HeNB. The information about a cell includes a Physical-layer Cell Identifier (PCI) of the cell, an identifier of the cell, a tracking area code (TAC), and frequency information.

At operation 407, the X2 GW sets up a SCTP association with the eNB (or the HeNB). The present operation is not performed if the SCTP association has been already set up between the eNB (or the HeNB) and the X2 GW. The X2 GW knows the eNB (or the HeNB) according to the eNB IP received from HeNB at operation 406.

At operation 408, the X2 GW transmits to the eNB (or the HeNB) an X2 setup request message. The message contains the information about the serving cell. The information about the serving cell includes information about a cell of the HeNB which is connected to the X2 GW. The information about the cell includes the PCI of the cell, the identifier of the cell, the TAC, and the frequency information. The X2 GW may send the eNB configuration update message to the eNB (or the HeNB) in this operation if the X2 connection has been already set up between the eNB (or the HeNB) and the X2 GW. The X2 GW sends to the eNB (or the HeNB) the X2 setup request message or the eNB configuration update message according to the IP address of the eNB (or the HeNB) received from the HeNB.

The X2 setup request message or the eNB configuration update message may include the IP address of the HeNB.

At operation 409, the eNB (or the HeNB) transmits to the X2 GW an X2 setup response message or an eNB configuration update confirmation message. The message contains the information about the serving cell. The information about the cell includes the PCI of the cell, the identifier of the cell, the TAC, and the frequency information. The eNB (or the HeNB) sends the X2 setup response message if the eNB (or the HeNB) receives the X2 setup request message. The eNB (or the HeNB) sends the eNB configuration update confirmation message if the eNB (or the HeNB) receives the eNB configuration update message.

The X2 setup response message or the eNB configuration update confirmation message may include the identifier or the IP address of the peer HeNB.

The eNB (or the HeNB) may send to the X2 GW an X2 setup failure message or an eNB configuration update confirmation failure message if the eNB (or the HeNB) cannot accept the setup of X2 or cannot accept the eNB configuration update. The message may include the identifier or the IP address of the peer HeNB. In this way, the X2 GW can send the failure message to a corresponding HeNB or eNB when the X2 GW receives a plurality of X2 setup request messages or eNB configuration update messages sent from multiple HeNBs or eNBs.

At operation 410, the X2 GW transmits to the HeNB an X2 setup information confirmation message. The X2 setup information confirmation message may be the X2 setup response message, or the eNB configuration update confirmation message, or a new message. The X2 GW sends the X2 setup response message if the X2 GW receives from the HeNB the X2 setup request message. The X2 GW sends the eNB configuration update confirmation message if the X2 GW receives from the HeNB the eNB configuration update message. The X2 GW sends a new response message if the X2 GW receives from HeNB a new message.

The X2 GW sends the message to the corresponding HeNB according to the neighbor cell information included in the message received from the eNB (or the HeNB), or according to the neighbor cell information included in the message received from the eNB (or the HeNB) and the information stored in the X2 GW (e.g., the ID or the IP address of the HeNB), or according to the identifier or the IP address of the peer HeNB included in the message received from the eNB (or the HeNB). The message contains information about a serving cell of the eNB or the HeNB. The information about the serving cell includes the PCI of the cell, the identifier of the cell, the TAC, and the frequency information. This operation may be a response message of operation 406, or may be a separate indication message. This operation is an optional operation, i.e., the method that the X2 GW obtains the IP address of the neighbor eNB and sets up X2 includes a technical solution in which this operation is included and another technical solution in which this operation is not included.

Second Embodiment

Figure 5:
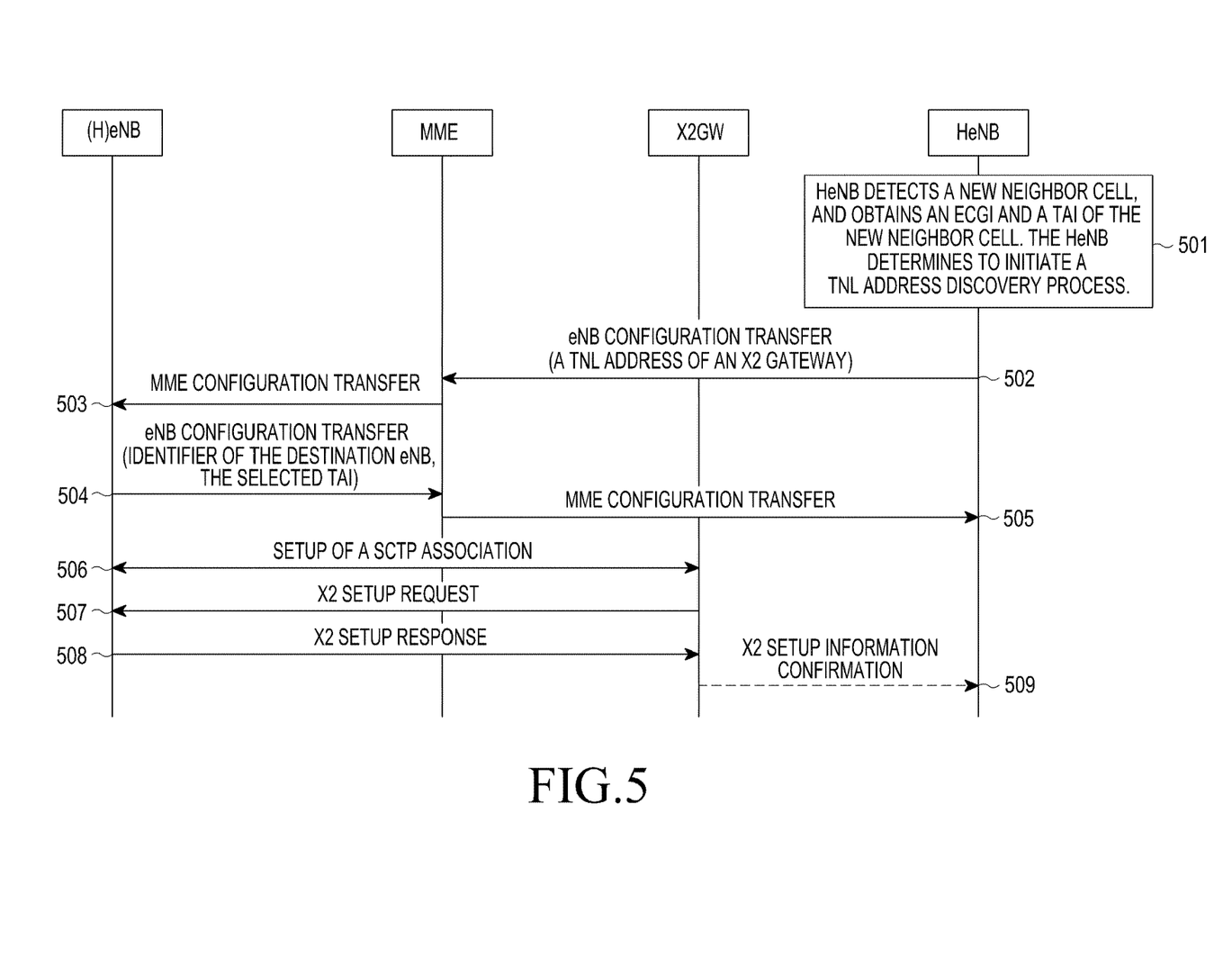
FIG. 5 is a schematic diagram illustrating a second embodiment for setting up X2 through a GW according to an embodiment of the present disclosure.

FIG. 5 illustrates the second embodiment for setting up X2 through a GW according to an embodiment of the present disclosure. In this embodiment, an HeNB detects a new neighbor cell covered by an eNB (or an HeNB), and triggers an X2 setup process. The following is a detailed description of this embodiment of the present disclosure. It is omitted herein that the detailed descriptions of operations which are not related to contents of the present disclosure.

Referring to FIG. 5, at operation 501, the HeNB detects the new neighbor cell.

The HeNB detects the new neighbor cell through a report of a UE. The HeNB obtains an ECGI and a TAI of the neighbor cell through the report of the UE. A global eNB identifier may be obtained according to an ECGI. The HeNB determines to initiate a TNL address discovery process.

At operation 502, the HeNB transmits to a MME an eNB configuration transfer message, wherein the message contains an identifier of a source eNB, an identifier of a destination eNB, and SON information. The identifier of the source eNB is configured as the selected TAI and a global eNB identifier of the HeNB or an X2 GW. The identifier of the destination eNB is configured as a global eNB identifier of the eNB (or the HeNB) where the new neighbor cell locates and the selected TAI. The SON information is configured as an information request which requests configuration information of an X2 TNL. The message contains the configuration information of the X2 TNL of the source base station. The configuration information of the X2 TNL includes a TNL address of the X2 GW to which the HeNB is connected. If the identifier of the source eNB is configured as the identifier of the HeNB, as another embodiment of the present disclosure, the message may contain an identifier of the X2 GW to which the HeNB is connected.

The TNL address of the X2 GW may be a new information element, or may be an X2 TNL address of the source eNB in an existing eNB configuration transfer message. If using the existing X2 TNL address of the source eNB in the existing eNB configuration transfer message to transfer the TNL address of the X2 GW, the eNB configuration transfer message may contain a new information element, i.e., an indication of the TNL address of the X2 GW. If the message contains the identifier of the X2 GW, the indication of the TNL address of the X2 GW may not be contained.

The HeNB knows the TNL address of the X2 GW to which the HeNB is connected and/or the identifier of the X2 GW through pre-configuration or other methods.

In a situation where there an HeNB GW is deployed, the eNB configuration transfer message is transmitted to the MME through the HeNB GW.

At operation 503, the MME finds the destination eNB (or the HeNB) according to the identifier of the destination eNB (including the global eNB identifier and the selected TAI), and transmits to the destination eNB (or the HeNB) a MME configuration transfer message.

At operation 504, the eNB (or the HeNB) transmits to the MME an eNB configuration transfer message. The message contains the identifier of the source eNB, the identifier of the destination eNB, and the SON information. The identifier of the source eNB is set as the global eNB identifier of the eNB (or the HeNB) and the selected TAI. The identifier of the destination eNB is set as the global eNB identifier of the source eNB received at operation 503 and the selected TAI. The SON information includes SON information response which includes a TNL address of the eNB (or the HeNB).

At operation 505, the MME transmits to the HeNB a MME configuration transfer message.

In the situation where the HeNB GW is deployed, the MME configuration transfer message is transmitted to the HeNB through the HeNB GW.

At operation 506, the eNB (or the HeNB) knows that the destination HeNB is connected to the X2 GW according to the new information element contained in the message at operation 503, i.e., the TNL address of the X2 GW, or the indication of the TNL address of the X2 GW, or the identifier of the X2 GW. The eNB (or the HeNB) initiates a SCTP association process with an entity indicated by the TNL address contained in the message at operation 503, i.e., the X2 GW. The present operation is not performed if the SCTP association has already been set up between the eNB (or the HeNB) and the X2 GW.

At operation 507, the eNB (or the HeNB) transmits to the X2 GW an X2 setup request message.

The message may contain information about a serving cell of the eNB (or the HeNB), or may contain information about a neighbor cell of the serving cell of the eNB (or the HeNB). The information about the cell includes a PCI of the cell, an identifier of the cell, a TAC, and frequency information.

The message may further include the identifier or the IP address of the HeNB.

At operation 508, the X2 GW transmits to the eNB (or the HeNB) an X2 setup response message. The message contains the information about the serving cell. The information about the serving cell includes information about a cell of the HeNB which is connected to the X2 GW. The information about the cell includes the PCI of the cell, the identifier of the cell, the TAC, and the frequency information.

At operation 509, the X2 GW transmits to the HeNB an X2 setup information indication message. The X2 GW may initiate the X2 setup process between the X2 GW and the HeNB. The X2 setup information indication message may be the eNB configuration update message if the X2 connection between the X2 GW and the HeNB has been already set up. The X2 GW sends the message to the corresponding HeNB according to the neighbor cell information included in the message received from the eNB (or the HeNB), or according to the neighbor cell information included in the message received from the eNB (or the HeNB) and the information stored in the X2 GW (e.g., the ID or the IP address of the HeNB), or according to the identifier or the IP address of the peer HeNB included in the message received from the eNB (or the HeNB).

The message contains information about the serving cell of the eNB (or the HeNB). The information about the cell includes the PCI of the cell, the identifier of the cell, the TAC, and the frequency information. This operation is an optional operation, i.e., the method for setting up X2 includes a technical solution in which this operation is included and another technical solution in which this operation is not included.

It should be noted that there is no absolute sequence between operation 508 and operation 509.

Third Embodiment

Figure 6:
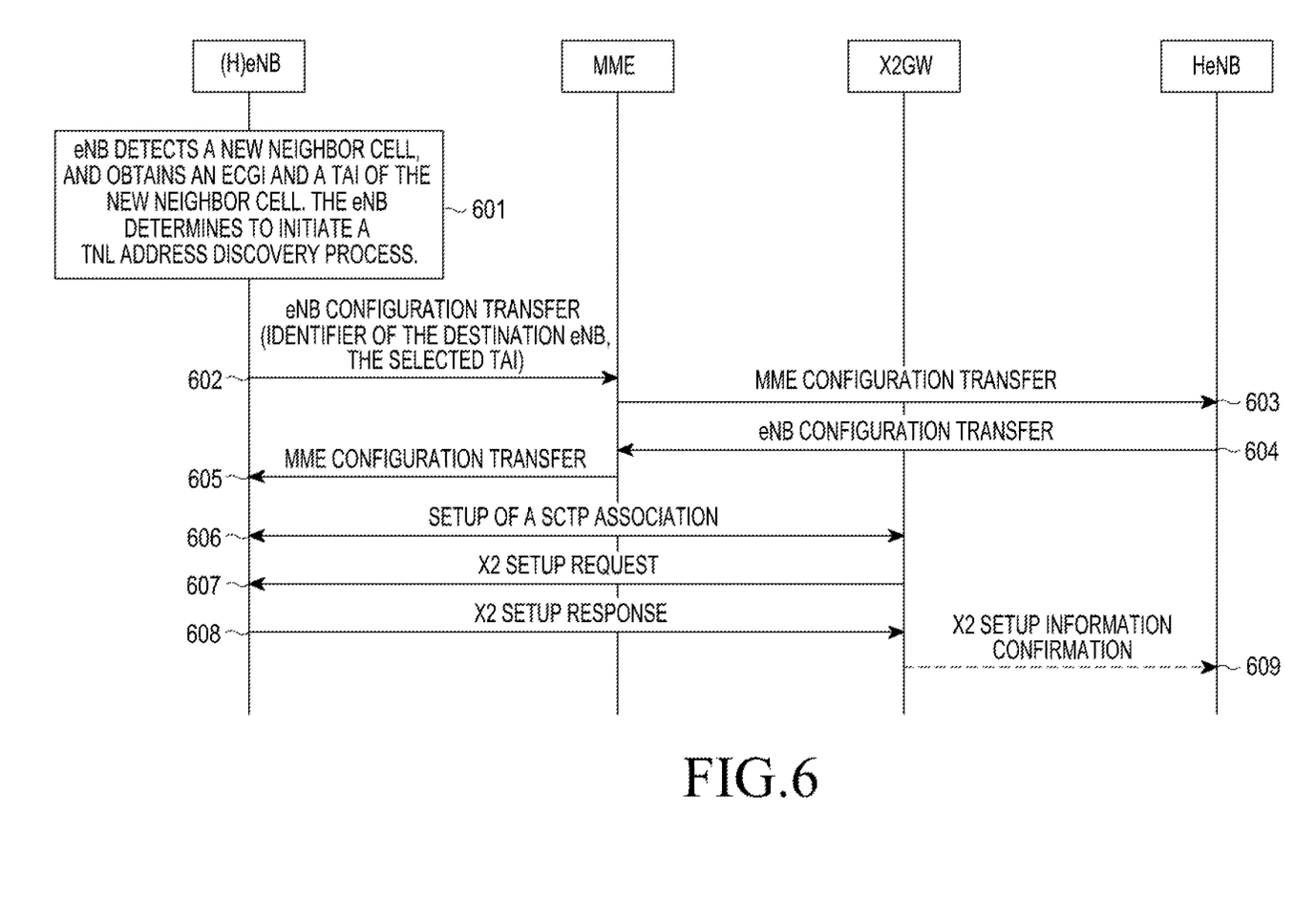
FIG. 6 is a schematic diagram illustrating a third embodiment for setting up X2 through a GW according to an embodiment of the present disclosure.

FIG. 6 illustrates the third embodiment for setting up X2 connection through an X2 GW according to an embodiment of the present disclosure. In this embodiment of the present disclosure, an eNB (or an HeNB) detects a new neighbor cell covered by an HeNB, and triggers an X2 setup process. The following is a detailed description of this embodiment of the present disclosure. It is omitted herein that the detailed descriptions of operations which are not related to contents of the present disclosure.

Referring to FIG. 6, at operation 601, the eNB (or the HeNB) detects the new neighbor cell.

The eNB (or the HeNB) detects a new neighbor cell through a report of a UE. The eNB (or the HeNB) obtains an ECGI and a TAI of the neighbor cell through the report of the UE. A global eNB identifier may be obtained according to an ECGI. The eNB (or the HeNB) determines to request a TNL address of the base station where the new neighbor cell locates.

At operation 602, the eNB (or the HeNB) transmits to a MME an eNB configuration transfer message.

The message contains an identifier of a source eNB, an identifier of a destination eNB, and SON information. The identifier of the source eNB is set as a global eNB identifier of the eNB (or the HeNB) and the selected TAI. The identifier of the destination eNB is set as a global eNB identifier of the HeNB where the new neighbor cell locates and the selected TAI. The SON information is configured as an information request which requests configuration information of an X2 TNL.

At operation 603, the MME transmits to the HeNB a MME configuration transfer message. The configuration of an information element in the message is the same as that at operation 602.

In a situation where there an HeNB GW is deployed, the MME configuration transfer message is transmitted to the HeNB through the HeNB GW.

At operation 604, the HeNB transmits to the MME an eNB configuration transfer message.

The message contains the identifier of the source eNB, the identifier of the destination eNB, and the SON information. The identifier of the source eNB is set as the selected TAI and the global eNB identifier of the HeNB or an identifier of an X2 GW. The identifier of the destination eNB is set as the global eNB identifier of the eNB (or the HeNB) and the selected TAI. The SON information includes SON information response which includes a TNL address of the X2 GW to which the HeNB is connected. The message may contain the identifier of the X2 GW to which the HeNB is connected. The SON information response may further include the IP address of the HeNB.

The HeNB detects an IP address of the X2 GW to which the HeNB is connected and/or the identifier of the X2 GW through pre-configuration or other methods. The HeNB may not set up the SCTP association with the X2 GW, or may not set up the X2 interface. Alternatively, the HeNB may have already set up an SCTP association with the X2 GW. Or an X2 interface may have already been set up between the HeNB and the X2 GW. The embodiment of the present disclosure does not limit herein.

In the situation where there the HeNB GW is deployed, the eNB configuration transfer message is transmitted to the MME through the HeNB GW.

At operation 605, the MME transmits to the eNB (or the HeNB) a MME configuration transfer message. The configuration of the information element in the message is the same as that at operation 604.

At operation 606, the eNB (or the HeNB) sets up a SCTP association with the X2 GW. The eNB (or the HeNB) sets up the SCTP association with a corresponding entity according to the TNL address of the X2 GW received at operation 605. The eNB (or the HeNB) may not know whether the opposite peer is the HeNB, or the eNB, or the HeNB which is connected to the X2 GW. The present operation is not performed if the SCTP association between the eNB (or the HeNB) and the X2 GW has been already set up.

At operation 607, the eNB (or the HeNB) transmits to the X2 GW an X2 setup request message. The eNB (or the HeNB) sets up X2 with the corresponding entity according to the TNL address received at operation 605. The eNB (or the HeNB) may not know whether the opposite peer is the HeNB, or the eNB, or the HeNB which is connected to the X2 GW.

The message may contain information about a serving cell. The information about the serving cell includes information about a serving cell of the eNB (or the HeNB). The information about the cell includes a PCI of the cell, an identifier of the cell, a TAC, and frequency information.

The message may further include the identifier or the IP address of the peer HeNB.

At operation 608, the X2 GW transmits to the eNB (or the HeNB) an X2 setup response message. The message contains the information about a serving cell. The information about the serving cell includes information about a cell of the HeNB which is connected to the X2 GW. The information about the cell includes the PCI of the cell, the identifier of the cell, the TAC, and the frequency information.

At operation 609, the X2 GW transmits to the HeNB an X2 setup information indication message. The X2 GW may initiate the X2 setup process between the X2 GW and the HeNB. In this case, the X2 setup information indication message may be the X2 setup request message. The X2 setup information indication message may be the eNB configuration update message if the X2 interface between the X2 GW and the HeNB has been already set up. The X2 GW sends the message to the corresponding HeNB according to the neighbor cell information included in the message received from the eNB (or the HeNB), or according to the neighbor cell information included in the message received from the eNB (or the HeNB) and the information stored in the X2 GW (e.g., the ID or the IP address of the HeNB), or according to the identifier or the IP address of the peer HeNB included in the message received from the eNB (or the HeNB).

The message contains information about the serving cell of the eNB or the HeNB (or the HeNB). The information about the serving cell includes the PCI of the cell, the identifier of the cell, the TAC, and the frequency information.

It should be noted that there is no absolute sequence between operation 608 and operation 609.

This operation is an optional operation, i.e., the method that the eNB (or the HeNB) obtains the IP address of the opposite peer and sets up X2 includes a technical solution in which this operation is included and another technical solution in which this operation is not included.

Figure 7:
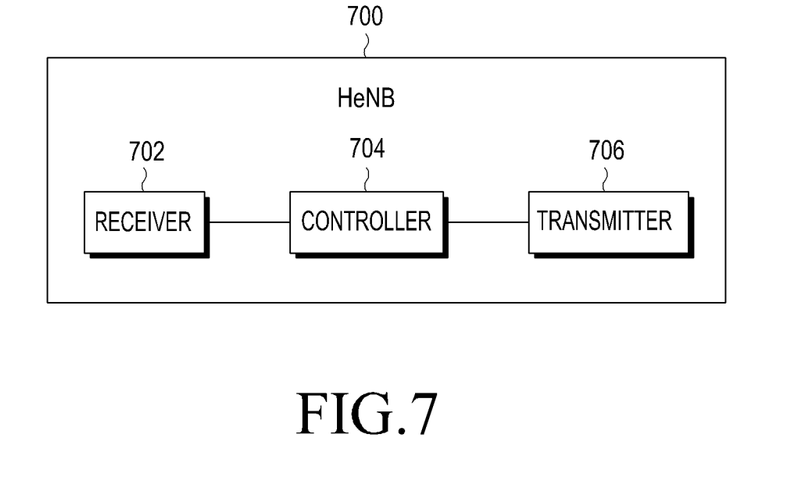
FIG. 7 illustrates a block diagram illustrating a home base station (HeNB) according to an embodiment of the present disclosure.

FIG. 7 illustrates a block diagram illustrating an HeNB according to an embodiment of the present disclosure.

Referring to FIG. 7, the HeNB 700 includes a receiver 702, a controller 704, and a transmitter 706.

The controller 704 obtains an IP address of a neighbor base station through a TNL address discovery process, a transmitter 706 transmits to the X2 GW the obtained IP address of the neighbor base station (e.g., eNB (or the HeNB)), the receiver 702 receives an X2 setup information confirmation message, from the X2 GW initiating an X2 interface setup process with the neighbor base station, or an eNB configuration update process with the neighbor base station. The X2 setup information confirmation message comprises information about a serving cell of the neighbor base station. The obtained IP address is transmitted through one of an X2 setup request message, an eNB configuration update message, and a new message. The X2 setup information confirmation message is one of an X2 setup response message, an eNB configuration update confirmation message, and a new message.

The receiver receives from the X2 GW a failure message received from the neighbor base station if the neighbor base station does not accept an X2 setup request or the eNB configuration update of the X2 GW, the failure message comprises an IP address or an identifier of the home base station.

Figure 8:
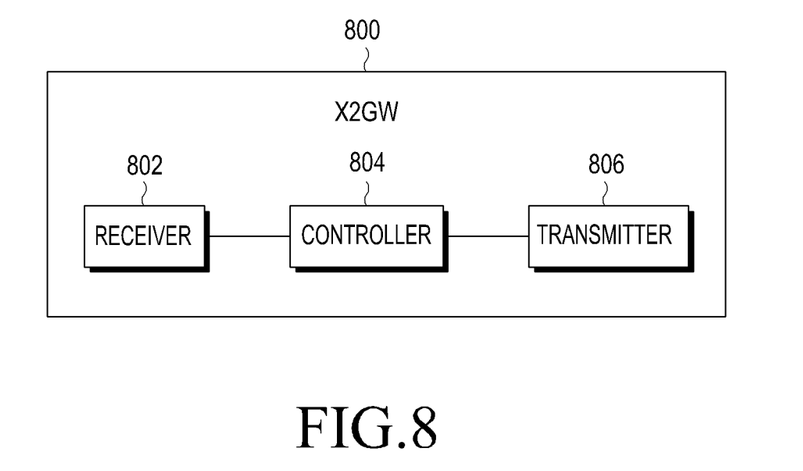
FIG. 8 illustrates a block diagram illustrating an X2 GW according to an embodiment of the present disclosure.

FIG. 8 illustrates a block diagram illustrating an X2 GW according to an embodiment of the present disclosure.

Referring to FIG. 8, the X2 GW 800 includes a receiver 802, a controller 804 and a transmitter 806.

The receiver 802 receives from a home base station an IP address of a neighbor base station obtained by the home base station through a TNL address discovery process, the controller 804 initiates an X2 interface setup process with the neighbor base station, or an eNB configuration update process with the neighbor base station, and a transmitter transmits an X2 setup information confirmation message to the home base station. The X2 setup information confirmation message comprises information about a serving cell of the neighbor base station. an X2 setup request message in the X2 interface setup process comprises information about a serving cell of the home base station connected to the X2 GW. The obtained IP address is received through one of an X2 setup request message, an eNB configuration update message, and a new message. The X2 setup information confirmation message is one of an X2 setup response message, an eNB configuration update confirmation message, and a new message.

The receiver 804 receives a failure message received from the neighbor base station if the neighbor base station does not accept an X2 setup request or the eNB configuration update of the X2 GW, the failure message comprises an IP address or an identifier of the home base station.

As can be seen from the above description, the method for setting up X2 through a GW provided by the present disclosure can reduce the impact on the macro base station, and reduce complexity of the configuration of the operator, so that an X2 handover is practicable.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for setting up an X2 connection with a home evolved node B (HeNB) through an X2 gateway (GW) by an evolved node B (eNB), the method comprising:
   identifying a global eNB identifier (ID) of the HeNB;
   transmitting, to a mobility management entity (MME), a first configuration transfer message to be forwarded to the HeNB, wherein the first configuration transfer message includes a first source ID, a first target ID, and a self-optimization networks (SON) information request for requesting configuration information of the X2 GW to which the HeNB is connected;
   receiving, from the MME, a second configuration transfer message which includes information transmitted from the HeNB in response to the first configuration transfer message, wherein the information transmitted from the HeNB includes a second source ID, a second target ID, and an SON information response including the configuration information of the X2 GW; and
   setting up the X2 connection based on the configuration information of the X2 GW,
   wherein the first source ID is set as a global eNB ID of the eNB and a tracking area ID (TAI), the first target ID is set as the global eNB ID of the HeNB and the TAI, the second source ID is set as the global eNB ID of the HeNB and the TAI, and the second target ID is set as the global eNB ID of the eNB and the TAI, and
   wherein the configuration information of the X2 GW comprises a transport network layer (TNL) address.

2. A method for setting up an X2 connection with an evolved node B (eNB) through an X2 gateway (GW) by a home eNB (HeNB), the method comprising:
   receiving, from a mobility management entity (MME), a first configuration transfer message which is forwarded from the eNB, wherein the first configuration transfer message includes a first source identifier (ID), a first target ID, and a self-optimization networks (SON) information request for requesting configuration information of the X2 GW to which the HeNB is connected;
   identifying the configuration information of the X2 GW in response to the first configuration transfer message;
   transmitting, to the MME, a second configuration transfer message including information to be forwarded to the eNB, wherein the information included in the second configuration transfer message includes a second source ID, a second target ID, and an SON information response including the configuration information of the X2 GW; and
   setting up the X2 connection based on the configuration information of the X2 GW,
   wherein the first source ID is set as a global eNB ID of the eNB and a tracking area ID (TAI), the first target ID is set as the global eNB ID of the HeNB and the TAI, the second source ID is set as the global eNB ID of the HeNB and the TAI, and the second target ID is set as the global eNB ID of the eNB and the TAI, and
   wherein the configuration information of the X2 GW comprises a transport network layer (TNL) address.

3. An evolved node B (eNB) for setting up an X2 connection with a home eNB (HeNB) through an X2 gateway (GW), the eNB comprising:
   a controller configured to identify a global eNB identifier (ID) of the HeNB and set up the X2 connection based on configuration information of the X2 GW; and
   a transceiver configured to:
      transmit, to a mobility management entity (MME), a first configuration transfer message to be forwarded to the HeNB, wherein the first configuration transfer message includes a first source ID, a first target ID, and a self-optimization networks (SON) information request for requesting the configuration information of the X2 GW to which the HeNB is connected, and
      receive, from the MME, a second configuration transfer message which includes information transmitted from the HeNB in response to the first configuration transfer message, wherein the information transmitted from the HeNB includes a second source ID, a second target ID, and an SON information response including the configuration information of the X2 GW,
   wherein the first source ID is set as a global eNB ID of the eNB and a tracking area ID (TAI), the first target ID is set as the global eNB ID of the HeNB and the TAI, the second source ID is set as the global eNB ID of the HeNB and the TAI, and the second target ID is set as the global eNB ID of the eNB and the TAI, and
   wherein the configuration information of the X2 GW comprises a transport network layer (TNL) address.

4. A home evolved node B (HeNB) for setting up an X2 connection with an evolved node B (eNB) through an X2 gateway (GW), the HeNB comprising:
   a transceiver configured to receive, from a mobility management entity (MME), a first configuration transfer message which is forwarded from the eNB, wherein the first configuration transfer message includes a first source identifier (ID), a first target ID, and a self-optimization networks (SON) information request for requesting configuration information of the X2 GW to which the HeNB is connected; and
   a controller configured to:
      identify the configuration information of the X2 GW in response to the first configuration transfer message,
      control the transceiver to transmit, to the MME, a second configuration transfer message including information to be forwarded to the eNB, wherein the information included in the second configuration transfer message which includes a second source ID, a second target ID, and an SON information response including the configuration information of the X2 GW, and
      set up the X2 connection based on the configuration information of the X2 GW,
   wherein the first source ID is set as a global eNB ID of the eNB and a tracking area ID (TAI), the first target ID is set as the global eNB ID of the HeNB and the TAI, the second source ID is set as the global eNB ID of the HeNB and the TAI, and the second target ID is set as the global eNB ID of the eNB and the TAI, and
   wherein the configuration information of the X2 GW comprises a transport network layer (TNL) address.

\* \* \* \* \*